(12) United States Patent
Liu et al.

(10) Patent No.: US 8,988,520 B2
(45) Date of Patent: Mar. 24, 2015

(54) METHOD AND APPARATUS FOR IMPROVING DEPTH OF FIELD (DOF) IN MICROSCOPY

(75) Inventors: Ming-Chang Liu, San Jose, CA (US); Mark Robertson, Cupertino, CA (US)

(73) Assignee: Sony Corporation, Tokyo (JP)

( * ) Notice: Subject to any disclaimer, the term of this patent is extended or adjusted under 35 U.S.C. 154(b) by 345 days.

(21) Appl. No.: 13/553,265

(22) Filed: Jul. 19, 2012

(65) Prior Publication Data

US 2014/0022346 A1 Jan. 23, 2014

(51) Int. Cl.
| | |
|---|---|
| H04N 9/47 | (2006.01) |
| G02B 21/24 | (2006.01) |
| G02B 21/36 | (2006.01) |
| H04N 19/00 | (2014.01) |

(52) U.S. Cl.
CPC ............ *G02B 21/244* (2013.01); *G02B 21/367* (2013.01); *H04N 19/00* (2013.01)
USPC .............. 348/79; 348/355; 348/356; 382/255

(58) Field of Classification Search
USPC .............. 348/79, 80, 354–356; 382/191, 255, 382/265, 263
See application file for complete search history.

(56) References Cited

U.S. PATENT DOCUMENTS

| | | | |
|---|---|---|---|
| 6,201,899 B1 | 3/2001 | Bergen | |
| 2006/0038144 A1 | 2/2006 | Maddison | |
| 2007/0018977 A1 | 1/2007 | Niem et al. | |
| 2011/0090326 A1 | 4/2011 | Kenny et al. | |
| 2011/0133054 A1 * | 6/2011 | Campbell | 250/201.2 |
| 2011/0169985 A1 * | 7/2011 | Cooper | 348/241 |
| 2012/0061590 A1 | 3/2012 | Khojasteh et al. | |
| 2012/0092546 A1 | 4/2012 | Borovytsky | |
| 2012/0281132 A1 * | 11/2012 | Ogura et al. | 348/348 |

FOREIGN PATENT DOCUMENTS

| | | | |
|---|---|---|---|
| JP | 9274142 A | 10/1997 | |
| JP | 9298682 A | 11/1997 | |
| JP | 2000147384 A | 5/2000 | |
| JP | 2000357229 A | 12/2000 | |
| JP | 2001257932 A | 9/2001 | |
| JP | 2002250707 A | 9/2002 | |
| JP | 2006323045 A | 11/2006 | |
| JP | 2008271240 A | 11/2008 | |
| JP | 2009175682 A | 8/2009 | |
| WO | WO-02082805 A1 | 10/2002 | |
| WO | WO-2011158515 A1 | 12/2011 | |

OTHER PUBLICATIONS

Valdecasas, A. G., et al., "On the extended depth of focus algorithms for bright field microscopy." Micron, 2001, vol. 32, pp. 559-569, Abstract.

(Continued)

*Primary Examiner* — Michael Lee
(74) *Attorney, Agent, or Firm* — Moder Taboada (57) ABSTRACT

A method for improving depth for field (DOF) in microscopic imaging, the method comprising combining a sequence of images captured from different focal distances to form an all-focus image, comprising computing a focus measure at every pixel, finding the largest peaks at each position in the focus measure as multiple candidate values and blending the multiple candidates values according to the focus measure to determine the all-focus image.

18 Claims, 5 Drawing Sheets

(56) References Cited

OTHER PUBLICATIONS

Forster, Brigitte, et al., "Complex Wavelets for Extended Depth-of-Field: A New Method for the Fusion of Multichannel Microscopy Images." Microscopy Research and Technique, 2004, vol. 65, pp. 33-42.

Aguet, Francois, Van De Ville, Dimitri and Unser, Michael, "Model-Based 2.5-D Deconvolution for Extended Depth of Field in Brightfield Microscopy." IEEE Transactions on Image Processing, Jul. 2008, Issue 7, vol. 17, pp. 1144-1153.

Wu, H.-S., Barba, J and Gil, J., "A Focusing Algorithm for High Magnification Cell Imaging." Journal of Microscopy, 1996, vol. 184, pp. 133-142, Abstract.

Burt, Peter J. and Kolczynski, Raymond J., "Enhanced Image Capture Through Fusion." 1993. Proceedings of the Fourth International Conference on Computer Vision. pp. 173-182.

Hui, Li, B.S. Manjunath, and Sanjit K. Mitra, "Multi-Sensor Image Fusion Using the Wavelet Transform." 1994. Proceedings of the IEEE International Conference on Image Processing. vol. 1, pp. 51-55.

Tiago Ferreira and Wayne Rasband "ImageJ" U.S. National Institutes of Health, Bethesda, Maryland, USA, Dec. 27, 2011, 179 pages. http://rsbweb.nih.gov/ij/docs/user-guide.pdf.

Helmli, et al.; "Adaptive Shape From Focus With an Error Estimation in Light Microscopy"; ISPA 2011; Proceedings of the $2^{nd}$ International Symposium on Image and Signal Processing and Analysis in Conjunction with $23^{rd}$ International Conference on Information Technology Interfaces (IEEE Cat. No. 01EX480), Jun. 21, 2001, pp. 188-193.

Mahmood, et al.; 3D Shape Recovery From Image Focus Using Kernel Regression in Eigenspace; Image and Vision Computing, Elsevier, Guildford, GB; vol. 28, No. 4; Apr. 1, 2010; pp. 634-643.

European Search Report for Application No. 13174924-4-1562, dated Nov. 4, 2013; 11 pages.

Japanese Patent Office Action dated May 26, 2013 for corresponding Japanese Application No. JP2013144308, 10 pages.

\* cited by examiner

METHOD AND APPARATUS FOR IMPROVING DEPTH OF FIELD (DOF) IN MICROSCOPY

BACKGROUND

1. Field of the Invention

Embodiments of the present invention generally relate to processing images pertaining to digital microscopy and, more specifically, to a method and apparatus for improving depth of field (DOF) in microscopy.

2. Description of the Related Art

A digital microscope images a specimen at different depths to create a sequence of digital images. Each image represents a slice of the specimen at a particular depth of focus. Thus, in a single slice of a specimen only a fraction of the entire specimen is in focus. The sequence of digital images is stacked along a Z dimension corresponding to depth, referred to as a Z-stack. Each image in a Z-stack is focused at a different depth in the captured specimen. The optics of digital microscopes impose a very narrow depth of field, too small to capture the entire specimen in focus with a single picture. Thus, all images in the Z-stack are of the same specimen, but with different focus for each image.

Existing methods for improving DOF of images, i.e., extended depth of field (EDOF) images, have a common underlying rationale. In existing methods, the best image for each specified location in an output image is found by identifying the digital image at a depth where the identified digital image gives the best focus at the specified location. As a result, an output pixel in the output image acquires a value based on the best image found. Existing methods differ in defining (i.e. determining) best focus and enhancing consistency in estimating depth-map. However, performance of these methods is often poor and the methods are problematic due to their high computational complexity.

Thus, there is a need for method and apparatus for improving depth of field (DOF) in microscopy.

SUMMARY OF THE INVENTION

An apparatus and/or method for improving depth of field (DOF) in microscopy, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present disclosure generally include a method and apparatus for improving depth of field (DOF) in microscopy. The apparatus for improving DOF in microscopy comprises a digital microscope for capturing microscope images of a specimen at different depths for creating a sequence of images and a computing device for combining a sequence of images captured from different focal distances to form a single all-focus image. The step of combining a sequence of images captured from different focal distances to form a single all-focus image comprises computing a focus measure at every pixel, finding a plurality of candidate values for an all-focus pixel based on the focus measure and blending the candidate values together according to the focus measure in order to determine a final pixel value for the all-focus image.

In certain embodiments, a method for Extended Depth of Field (EDOF) in microscopy, which combines a set of images taken with different focal distances to form a single all-focus image, is disclosed. It is possible to use the method to reduce a large stack of microscopy images to a single all-focus image, or to reduce a large stack of microscopy images to a smaller stack of microscopy images. Various embodiments of the method for EDOF in microscopy enable substantial data reduction in reducing a large stack of microscopy images to a single all-focus image or a smaller stack of microscopy images. According to one embodiment, the method first computes a focus measure at every pixel, and then finds multiple candidate values for the all-focus pixel based on the focus measure. The candidates are blended together according to the focus measure in order to determine the final all-focus image. A byproduct of the method is a depth-map, which may also be useful in certain applications.

Figure 1:
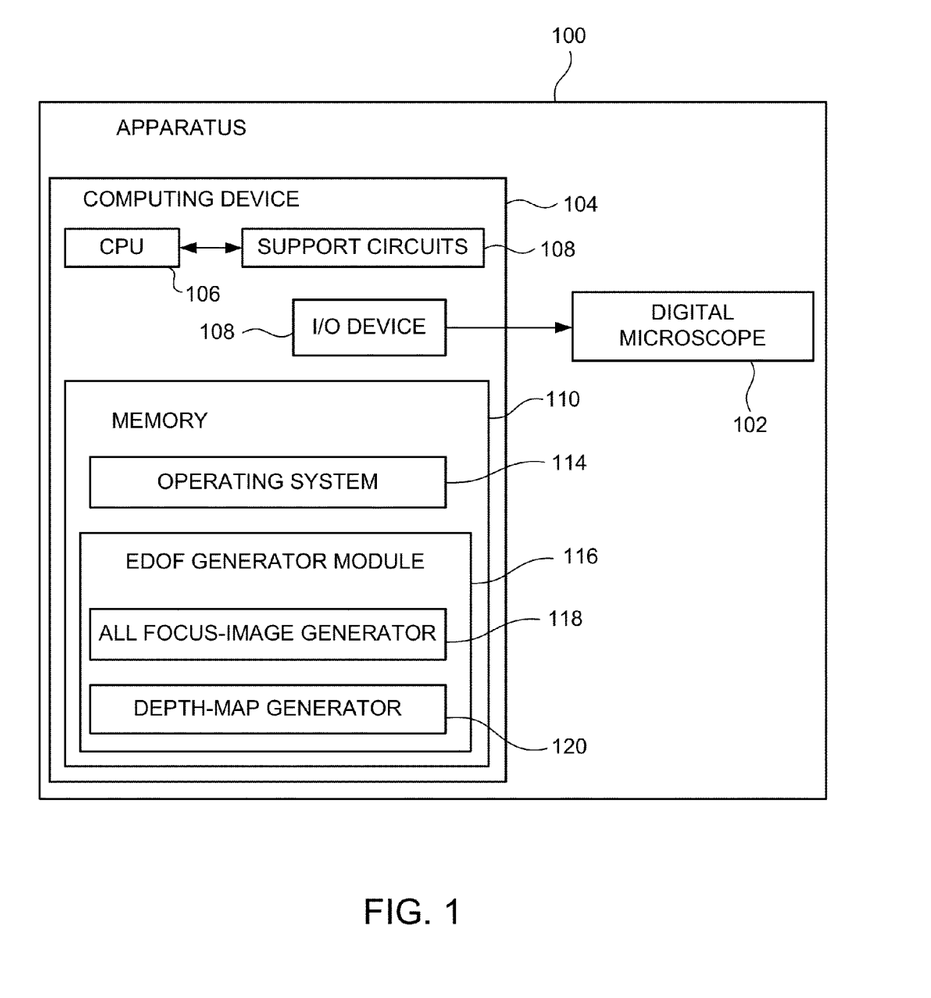
FIG. 1 depicts a block diagram of an apparatus for improving depth of field (DOF) in microscopy, in accordance with exemplary embodiments of the present invention.

FIG. 1 depicts a functional block diagram of an apparatus 100 for improving DOF in microscopy using a digital microscope 102, in accordance with exemplary embodiments of the present invention. The apparatus 100 comprises a digital microscope 102 and a computing device 104. In certain embodiments the digital microscope 102 is coupled to the computing device 104. In other embodiments, a stack of images is created by the microscope 102 and transferred to the computing device 104, e.g., via memory stick, compact disk, network connection or the like.

The digital microscope 102 captures digital images of a specimen at different depths of focus creating a sequence of images, where each image represents a "slice." The digital microscope 102 images the specimen at different depths to create the sequence of digital images. For purposes of illustration, the sequence of digital images is represented by the following expression 1:

$$I(x, y, z), \qquad \text{[Expression 1]}$$

where (x, y) is the spatial index with x=0 to X−1 and y=0 to Y−1 and z is the depth index with z=0 to Z−1.

The computing device 104 comprises a Central Processing Unit (CPU) 106, support circuits 108, a memory 110 and an I/O device 112. The CPU 106 may comprise one or more commercially available microprocessors or microcontrollers that facilitate data processing and storage. The various support circuits 108 facilitate the operation of the CPU 106 and include one or more clock circuits, power supplies, cache, input/output circuits, and the like. The memory 110 comprises at least one of Read Only Memory (ROM), Random Access Memory (RAM), disk drive storage, optical storage, removable storage and/or the like.

The memory 110 comprises an Operating System (OS) 114 and an EDOF generation module 116.

The EDOF generation module 116 comprises an all-focus image generator 118 and a depth-map generator 120. The EDOF generation module 116 facilitates combination of the sequence of digital images captured at different focal distances by the digital microscope 102 to form an all-focus image. The EDOF generation module 116 facilitates generation of a depth-map.

As used herein, the term "all-focus image" refers to the reduction of a Z-stack from three dimensions to two dimensions such that result contain the entire specimen in focus.

According to an exemplary embodiment, the all focus-image generator 118 generates an all focus-image. The depth-map generator 120 generates a depth-map as a by-product of the overall process of generating an all-focus image. In one embodiment, the depth map is used for data compression of a Z-stack. According to other embodiments the depth map is used to quickly "snap" the Z-dimension such that it shows the image most in-focus at a desired pixel without scrolling through all images manually as described in commonly assigned U.S. patent application Ser. Nos. 13/553,434 and 13/553,428. In operation, the computing device 104 executes the EDOF generation module 116. The EDOF generation module 116 is coupled with the all focus-image generator 118. The EDOF generation module 116 facilitates combining of the sequence of digital images captured by the digital microscope 102 at different focal distances to form an all-focus image. The all focus-image generator 118 computes a focus measure at every pixel of each of the sequence of digital images. The all focus-image generator 118 finds multiple candidate values for an all-focus pixel based on the focus measure. The all focus-image generator 118 blends the candidates together according to the focus measure to create a pixel value for an all-focus image.

Figure 2:
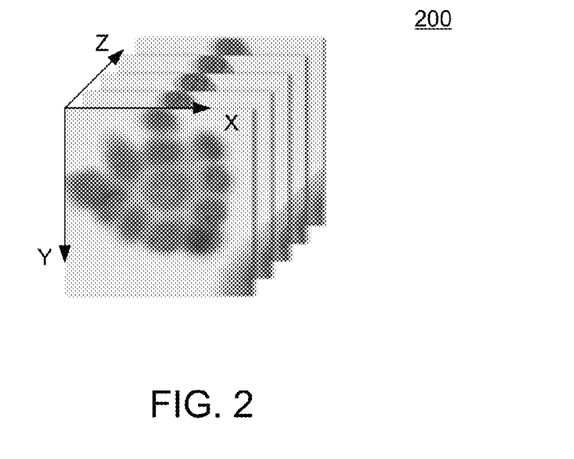
FIG. 2 depicts an example of a Z-stack, in accordance with exemplary embodiments of the present invention.

FIG. 2 depicts an example Z-stack 200 generated by the digital microscope 102. Each image in the Z-stack is focused at a different depth in the specimen. The digital microscope 102 captures digital images of a specimen at different focus depths to create a sequence of images. Thus, focus depth is incremented throughout the depth of the specimen to capture the entire specimen in focus in at least one of the digital images. The sequence of digital images is stacked along the Z dimension corresponding to depth, in addition to spatial dimensions X and Y, in the Z-stack.

Figure 3:
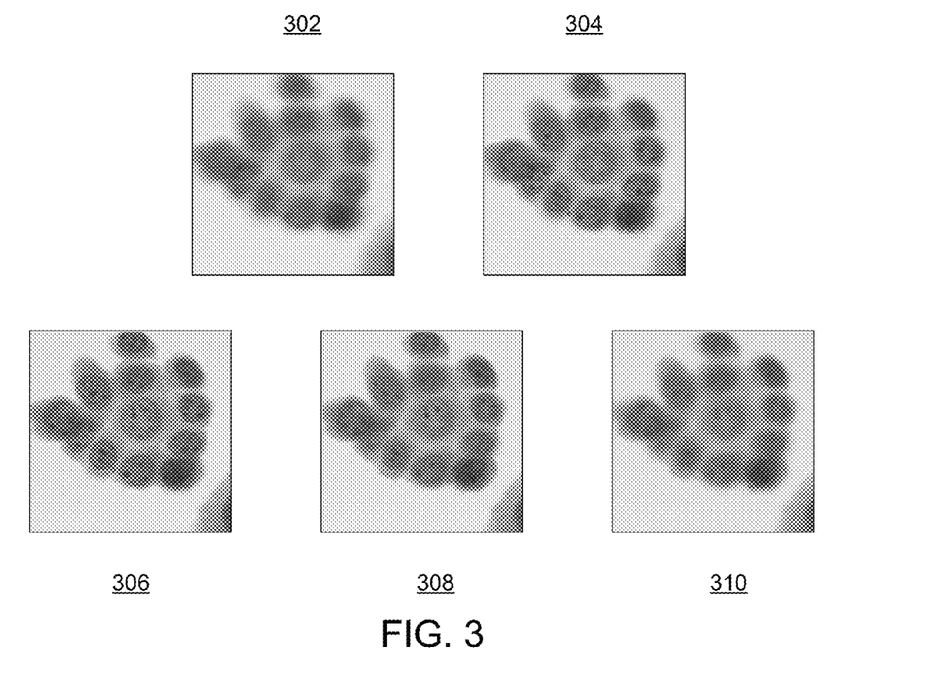
FIG. 3 depicts five individual digital images of FIG. 2, in accordance with exemplary embodiments of the present invention.

FIG. 3 depicts five individual images of the Z-stack 200 shown in FIG. 2, in accordance with exemplary embodiments of the present invention. FIG. 3 illustrates images 302, 304, 306, 308 and 310, each at different Z depths. For example, when a user of a digital microscope initially views a slide of a specimen, image 302 appears. If the user wishes to adjust the focus to a different Z depth, image 304 appears, and so on, forming the Z-stack 200 shown in FIG. 2.

Figure 4:
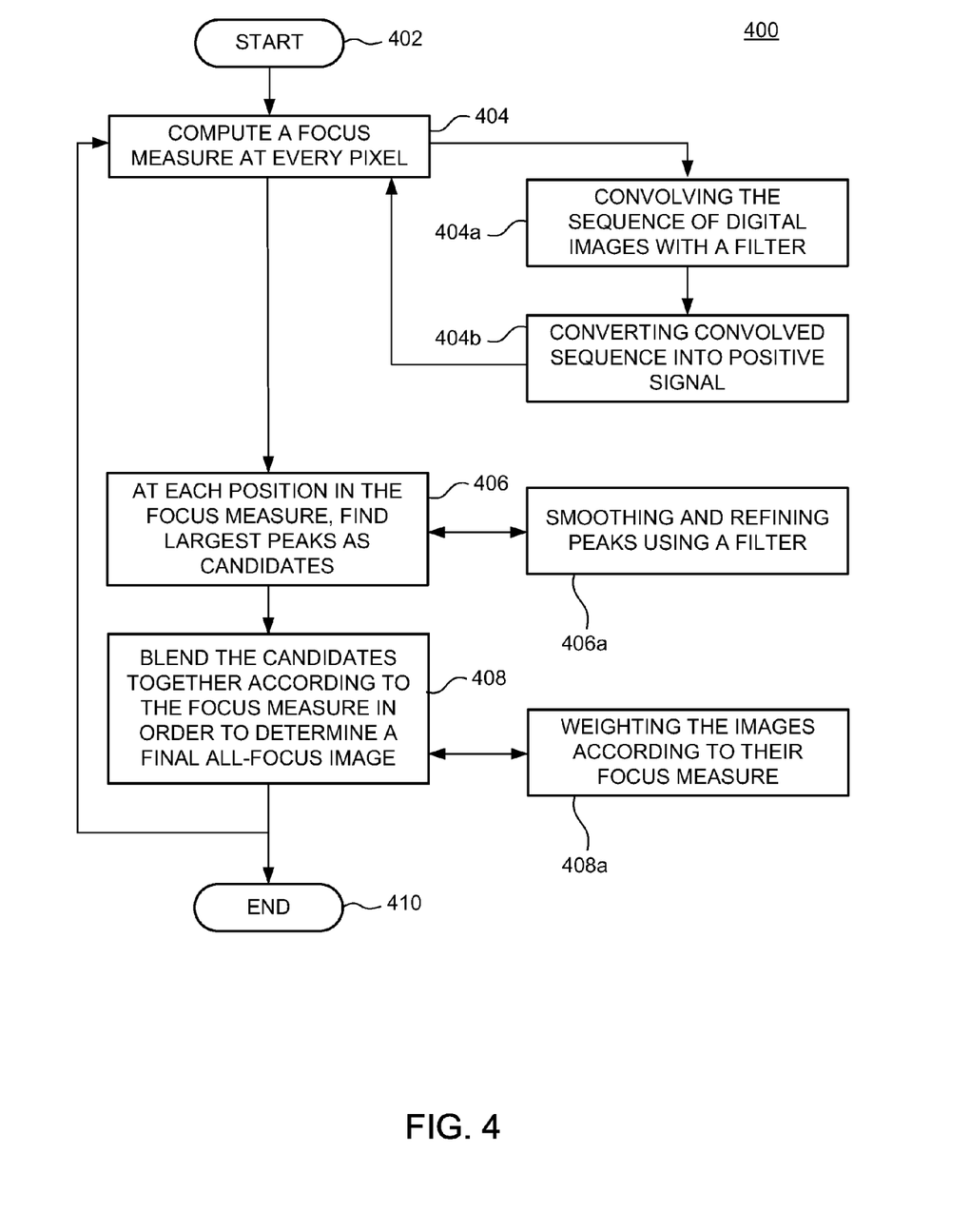
FIG. 4 depicts a flow diagram of a method for improving DOF, in microscopy, in accordance with exemplary embodiments of the present invention.

FIG. 4 is a flow diagram of a method 400 for improving DOF in microscopy, as performed by the EDOF generation module 116 of FIG. 1, in accordance with exemplary embodiments of the present invention.

The method 400 is implemented by the EDOF generation module 116 executed by the CPU 106 on the computing device 104. The EDOF generation module 116 comprises an all-focus image generator 118 and a depth-map generator 120. The EDOF generation module 116 facilitates combination of the sequence of digital images captured at different focal distances by the digital microscope 102 to form an all-focus image. The EDOF generation module 116 also facilitates generation of a depth-map.

The method begins at step 402 and proceeds to step 404.

At step 404, the all focus-image generator 118 computes a focus measure at every pixel of each of the sequence of digital images.

The focus measure is represented by following Expression:

$$H(x, y, z) \quad \text{[Expression 2]}.$$

The all focus-image generator 118 computes the focus measure by convolving a sequence of digital images with a two-dimensional (2-D) high-pass filter at step 404(a). The sequence of digital images and the 2-D high-pass filter are represented by following Expressions:

$$I(x, y, z) \quad \text{[Expression 3]}$$

and $$F_1(x, y) \quad \text{[Expression 4]}.$$

The all focus-image generator 118 converts the result of convolution of the sequence of digital images with the 2-D high-pass filter to a positive signal by taking the absolute value at each pixel position in the convolved result at step 404(b).

In certain alternate embodiments, the square of the absolute value, instead of the absolute value, is considered for converting the result of convolution. The all focus-image generator 118 convolves the result of conversion with a 2-D low-pass filter (not shown here explicitly), producing a focus measure H(x,y,z). The 2-D low-pass filter is represented by following Expression:

$$f_2(x, y) \quad \text{[Expression 5]}.$$

The method 400 then proceeds to step 406, where the all-focus image generator finds the largest peaks of one-dimensional function applied to the focus measure after smoothing as candidates at each position in the focus measure. The focus measure is a one-dimensional (1-D) function of z at each position in the focus measure. The 1-D function of z is represented by following Expression:

$$H_{x,y}(z) = H(x, y, z) \quad \text{[Expression 6]}.$$

Based on the assumption that the focus measure is a One-Dimensional (1-D) function of z at each position in the focus measure, the all focus-image generator 118 finds peaks at maximum in $H_{x,y}(z)$. According to some embodiments, a discrete 1-D function f[t] has a peak at $t_p$ if $f[t_p] > f[t_p+1]$ and $f[t_p] > f[t_p-1]$, i.e., a 1-D function can have multiple peaks The peaks (local maxima) at maximum in the smoothed version of $H_{x,y}(z)$ are represented by the following sequence of terms: $d_1(x, y), d_2(x, y) \ldots d_p(x, y)$. At step 406(a), the peaks are smoothed and refined. The all focus-image generator 118 smoothes the 1-D function of z, i.e., $H_{x,y}(z)$, by using a low-pass filter (not shown here explicitly) represented by the following Expression:

$$f_3(z) \quad \text{[Expression 7]}.$$

Smoothing prevents noise from yielding false peaks. The all focus-image generator 118 finds the peaks in smoothed version of $H_{x,y}(z)$. In certain optional embodiments, the all focus-image generator 118 refines the peaks found by finding the peak in the unsmoothed version of $H_{x,y}(z)$ in a small neighborhood of the peak found from the smoothed version of $H_{x,y}(z)$. The all focus-image generator 118 generates an improved DOF image, i.e. an EDOF image, at location (x, y). The EDOF image is a blended composite of pixels from original Z-stack I(x, y, z) at depths corresponding to the peaks found.

At step 408, the all focus-image generator 116 blends the candidates together according to the focus measure to determine an all-focus image corresponding to the peaks found in step 406 according to the following formula:

$$EDOF(x,y) = \Sum_{i=1}^{p} \gamma_i I(x, y, d_i(x,y)).$$

At step 408(a), the weights $\gamma_i$ are chosen such that a higher focus measure value leads to higher weight in the final weighted sum. There are many ways to choose weights that satisfy this general principle. According to one embodiment, the weights are chosen as follows: For i=1 ... p, set initial values $\hat{\gamma}_i = H_{x,y}(d_i(x,y)) - \min_z H_{x,y}(z)$. Subtracting the minimum value resets the zero according to a "noise floor". The weights are then specified as:

$$\gamma_i = \frac{\hat{\gamma}_i^2}{\sum_{j=1}^{p} \hat{\gamma}_j^2}$$

According to one embodiment, for the high-pass filter $f_1(x, y)$, a Gaussian-based filter with parameter $\beta$ is used according to the following formula:

$$f_1(x, y) = \delta(x, y) - \frac{1}{2\pi\beta^2} \exp\left(-\frac{x^2 + y^2}{2\beta^2}\right)$$

In this embodiment, $\beta=2.0$, although this value may be tuned to account for different circumstances in alternate embodiments. Note that $\delta(x, y)$ is the impulse function, defined as 1 at the origin and 0 elsewhere.

For the low-pass filter $f_2(x, y)$, a Gaussian-based filter with parameter $\alpha$ is used according to the following formula:

$$f_2(x, y) = \frac{1}{2\pi\alpha^2} \exp\left(-\frac{x^2 + y^2}{2\alpha^2}\right)$$

According to one embodiment, $\alpha=2.0$, although this value may be tuned to appropriately for different circumstances according to other embodiments. For the low-pass filter $f_3(z)$, a Gaussian-based filter with parameter $\sigma$ is used according to the following formula:

$$f_3(z) = \frac{1}{\sqrt{2\pi}\sigma} \exp\left(-\frac{z^2}{2\sigma^2}\right)$$

In this embodiment, $\sigma$ values that depend on the number of slices are used. For z-stacks with many slices, stronger smoothing is necessary (larger $\sigma$ value), whereas for z-stacks with fewer slices weaker smoothing is necessary (smaller $\sigma$ value). The exact value of $\sigma$ may be adjusted appropriately for different circumstances.

According to other embodiments, simplified filters are used to achieve similar results as with Gaussian filters. According to one embodiment, averaging (mean) filters are used instead of the Gaussian filters. A byproduct of the method 400 is a depth map, generated by the depth map generator 120. The depth map is simply the depths $d_i(x,y)$, and according to some embodiments, due to multiple peaks, there are more than one depth that has in-focus content at a particular position (x,y). Once the steps have been performed for all pixels, the method 400 proceeds to step 410 and ends.

Figure 5:
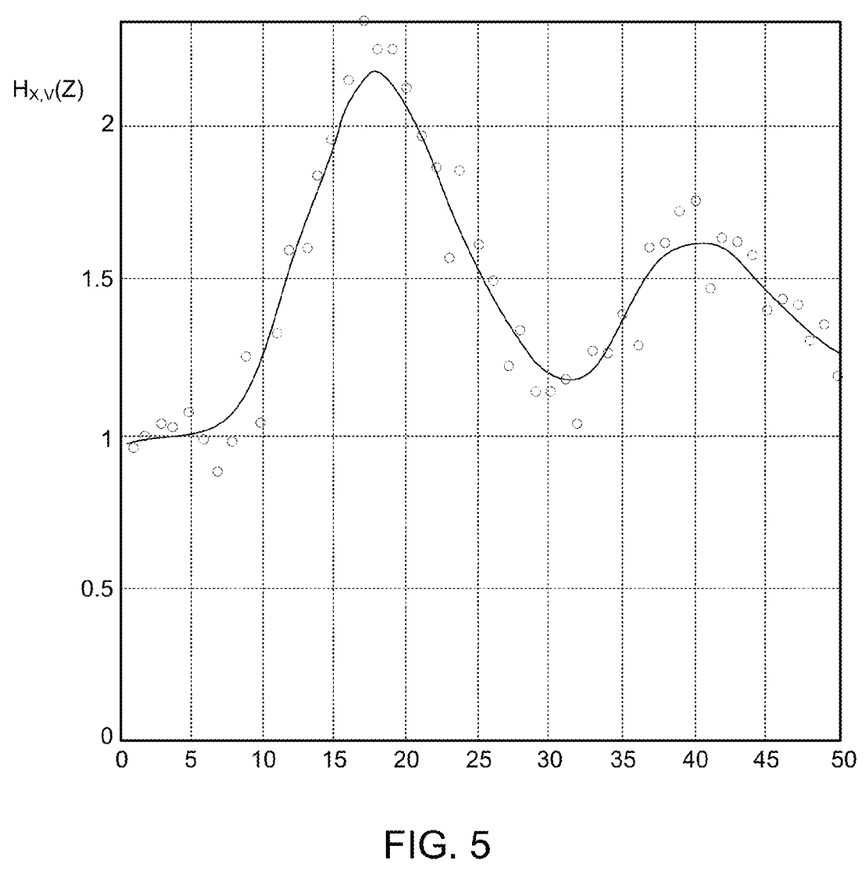
FIG. 5 depicts a graph illustrating an example of focus measure, in accordance with exemplary embodiments of the present invention.

FIG. 5 shows an example of focus measure, i.e. One-Dimensional (1-D) function of z, represented by $H_{x,y}(z)$ in the Expression 6 in a 2-D graphical representation on one "circle" of $H_{x,y}(z)$ versus z. Several points in the graph are illustrated using circles which represent the focus measures $H_{x,y}(z)$ at each of the images of the Z-stack, for one particular pixel in the image. Curve 500 represents the result of low-pass filtering with $f_3(z)$, showing more clearly the two peaks in the focus measure.

Figure 6:
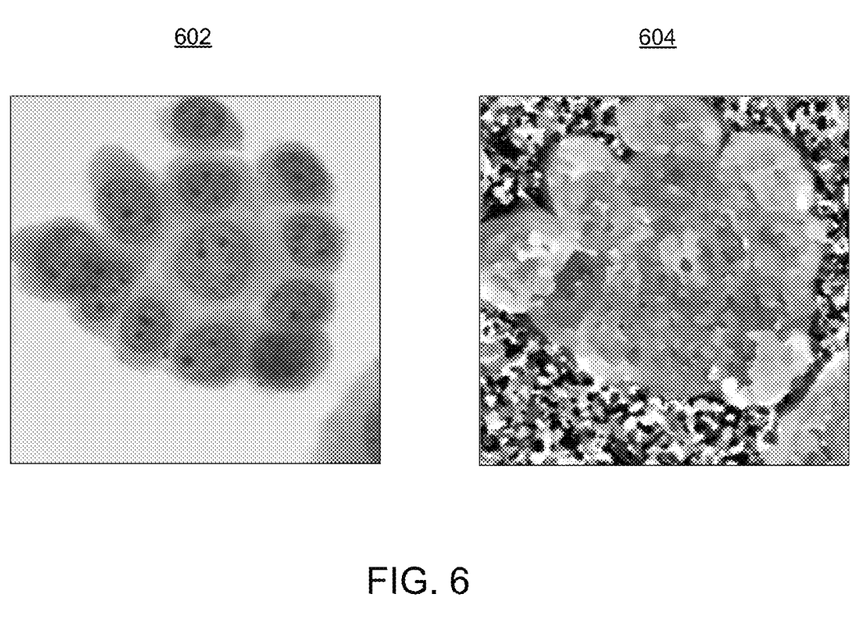
FIG. 6 depicts processed images, in accordance with the exemplary embodiments of the present invention.

FIG. 6 shows example results of processing according to some embodiments of this invention with two peaks, i.e., p=2. The original data set, i.e. Z-stack, contains 50 images, several of which were shown in FIGS. 2 and 3. In the FIG. 6, image 602 is the all-focus image, and the image 604 is a depth-map composed of dominant peak at each position. An additional depth-map is generated by considering secondary peaks. In an alternative embodiment, the Z-stack of M images is used to create a plurality of all-focus images for a subset of the Z-stack. M images are merged to form N all-focus images.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for improving depth for field (DOF) in microscopic imaging, the method comprising:
    combining a sequence of images captured from different focal distances to form an all-focus image, comprising:
    computing a focus measure at every pixel of each image of the sequence of images;
    finding one or more largest peaks of a one-dimensional function applied to the focus measure at each position in the focus measure as multiple candidate values; and
    blending the multiple candidate values according to the focus measure to determine a pixel value for the all-focus image and repeating for every pixel.

2. The method of claim 1, wherein the sequence of images is stacked in a Z-stack along a Z dimension corresponding to depth.

3. The method of claim 1, wherein combining the sequence of images captured from different focal distances and forming the all-focus image further comprises reducing data from three dimensions to two dimensions.

4. The method of claim 1, wherein computing the focus measure at every pixel further comprises convolving the sequence of images with a Two-Dimensional (2-D) high-pass filter to generate a convolution result;

converting the convolution result to a positive signal using an absolute value at each position to generate a converted signal; and convolving the converted signal with a 2-D low-pass filter.

5. The method of claim 1, wherein finding the largest peaks at each position in the focus measure further comprises
computing the focus measure as a One-Dimensional (1-D) function of z at each position in the focus measure;
finding one or more peaks in the One-Dimensional (1-D) function of z based on the computed focus measure;
smoothing the 1-D function of z by using a low-pass filter to generate a smoothed 1-D function; and
finding the peaks in the smoothed 1-D function.

6. The method of claim 4, wherein converting the convolution result comprises using the square of the absolute value instead of the absolute value.

7. The method of claim 5, wherein finding the one or more peaks at each position in the focus measure further comprises refining the peaks found by finding the peak in an unsmoothed version of the 1-D function of z in a neighborhood of the peak found from the smoothed 1-D function.

8. The method of claim 1 wherein the blending the multiple candidates values according to the focus measure to determine the all-focus image is performed according to the following formula $EDOF(x,y)=\Sigma_{i=1}^{P}\gamma_i I(x,y,d_i(x,y))$.

9. An apparatus for improving depth of field (DOF) in microscopic imaging, the apparatus comprising:
a digital microscope for capturing microscope images of a specimen at different depths for creating a sequence of images; and
an extended depth of field (EDOF) generator module for extending the depth of field of the specimen by forming an all focus image, comprising an all focus image generator module for:
computing a focus measure at every pixel of each image in the sequence of images;
finding one or more largest peaks of a one-dimensional function applied to the focus measure at each position in the focus measure as a multiple candidate values; and
blending the multiple candidate values according to the focus measure in order to determine a pixel value for an all-focus image and repeating for every pixel.

10. The apparatus of claim 9, wherein the sequence of images is stacked in a Z-stack along Z dimension corresponding to depth.

11. The apparatus of claim 9, wherein combining the sequence of images captured from different focal distances and forming the all-focus image further comprises reducing data from three dimensions to two dimensions.

12. The apparatus of claim 9, wherein computing the focus measure at every pixel further comprises convolving the sequence of images with a Two-Dimensional (2-D) high-pass filter; to generate a convolution result;

converting the convulution result to a positive signal using an absolute value at each position to generate a converted signal; and convolving the converted signal with a 2-D low-pass filter.

13. The apparatus of claim 9, wherein finding the largest peaks at each position in the focus measure further comprises:
the EDOF generator module computes the focus measure as a One-Dimensional (1-D) function of z at each position in the focus measure,
finding one or more peaks in the One-Dimensional (1-D) function of z based on the computed focus measure,
smoothing the 1-D function of z by using a low-pass filter to generate a smoothed 1-D function, and
finding the peaks in smoothed 1-D function.

14. The apparatus of claim 12, wherein converting the convultion result of comprises using the square of the absolute value, instead of the absolute value.

15. The apparatus of claim 13, wherein finding the one or more peaks at each position in the focus measure further comprises
refining the peaks found by finding the peak in an unsmoothed version of the 1-D function of z in a neighborhood of the peak found from the smoothed 1-D function.

16. A method for improving depth of field (DOF) in microscopic imaging, the method comprising:
combining a sequence of images captured from different focal distances to form an all-focus image, comprising:
computing a focus measure at every pixel of each image of the sequence of images by:
convolving the sequence of images with a Two-Dimensional (2-D) high-pass filter to generate a convolution result;
converting the convolution result to a positive signal using an absolute value at each position to generate a converted signal; and
convolving the converted signal with a 2-D low-pass filter;
finding one or more largest peaks at each position in the focus measure as multiple candidate values; and
blending the multiple candidate values according to the focus measure to determine a pixel value for the all-focus image and repeating for every pixel.

17. The method of claim 16, wherein converting the convolution result comprises using the square of the absolute value instead of the absolute value.

18. The method of claim 16 wherein blending the multiple candidates values according to the focus measure to determine the all-focus image is performed according to the following formula $EDOF(x,y)=\Sigma_{i=1}^{P}\gamma_i I(x,y,d_i(x,y))$.

* * * * *